VECTOR DISPLAY SYSTEM

INVENTOR.
WILLIAM J. DAVIS
BY John T. O'Halloran
Attorney

INVENTOR.
WILLIAM J. DAVIS
BY
John T. O'Halloran
Attorney

| | PROGRAM | | | OPERATIONS | | | | | |
|---|---|---|---|---|---|---|---|---|---|
| | COORDINATES X AXIS | Y AXIS | INSTRUCTION | END REGISTER | X AXIS BEGIN REGISTER | END DACON INPUT | END DACON OUTPUT | BEGIN DACON INPUT | BEGIN DACON OUTPUT |
| 1) | 0 000 000 000 | 1000 000 001 | SHIFT | 0 000 000 000 | | 1000 000 000 | | | |
| 2) | | | INITIATE VECTOR | 0 000 000 000 | 0 000 000 000 | 1000 000 000 | 0 VOLTS | 0 111 111 111 | 0 VOLTS |
| 3) | 0 111 111 111 | 0 000 000 000 | SHIFT | 0 111 111 111 | 0 000 000 000 | | | | |
| 4) | | | WRITE VECTOR 20 | 0 111 111 111 | 0 000 000 000 | 1 111 111 111 | 15 VOLTS | 0 111 111 111 | 0 VOLTS |
| 5) | | | TRANSFER | 0 111 111 111 | 0 111 111 111 | | | | |
| 6) | 0 000 000 000 | 0 111 111 111 | SHIFT | 0 000 000 000 | 0 111 111 111 | | | | |
| 7) | | | WRITE VECTOR 22 | 0 000 000 000 | 0 111 111 111 | 1000 000 000 | 0 VOLTS | 0 000 000 000 | 5 VOLTS |
| 8) | | | TRANSFER | 0 000 000 000 | 0 000 000 000 | | | | |
| 9) | 0 000 000 000 | 0 000 000 000 | SHIFT | 0 000 000 000 | 0 000 000 000 | | | | |
| 10) | | | INITIATE VECTOR | 0 000 000 000 | | 1000 000 000 | 0 VOLTS | 0 111 111 111 | 0 VOLTS |
| 11) | | | TRANSFER | 0 000 000 000 | 0 000 000 000 | | | | |
| 12) | 1000 000 001 | 1000 000 001 | SHIFT | 1000 000 001 | 0 000 000 000 | | | | |
| 13) | | | WRITE VECTOR 24 | 1000 000 001 | 0 000 000 000 | 0 000 000 001 | 5 VOLTS | 0 111 111 111 | 0 VOLTS |

Fig. 3a.

| | |
|---|---|
| Fig. 3a. | Fig. 3b. |

CODE

INVENTOR.
WILLIAM J. DAVIS
By John T. O'Halloran
Attorney

OPERATIONS

Y AXIS

| END REGISTER | BEGIN REGISTER | END DACON INPUT | END DACON OUTPUT | BEGIN DACON INPUT | BEGIN DACON OUTPUT |
|---|---|---|---|---|---|
| 1000000001 | | 1111111110 | | | |
| 1000000000 | 1000000001 | 1111111110 | +5 VOLTS | 0000000001 | -5 VOLTS |
| 0000000000 | 1000000001 | | | | |
| 0000000000 | 1000000001 | 0111111111 | 0 VOLTS | 0000000001 | -5 VOLTS |
| 0000000000 | 0000000000 | | | | |
| 0111111111 | 0000000000 | | | | |
| 0111111111 | 0000000000 | 0000000000 | -5 VOLTS | 1000000000 | 0 VOLTS |
| 0111111111 | 0111111111 | | | | |
| 0000000000 | 0111111111 | | | | |
| 0000000000 | 0111111111 | 0111111111 | 0 VOLTS | 1111111111 | +5 VOLTS |
| 0000000000 | 0000000000 | | | | |
| 1000000001 | 0000000000 | | | | |
| 1000000001 | 0000000000 | 0000000001 | -5 VOLTS | 1000000000 | 0 VOLTS |

Fig. 3b.

INVENTOR.
WILLIAM J. DAVIS
BY
John T. O'Halloran
Attorney 3,430,207
VECTOR DISPLAY SYSTEM
William J. Davis, Northridge, Calif., assignor to Radio Corporation of America, a corporation of Delaware
Filed Aug. 4, 1966, Ser. No. 570,323
U.S. Cl. 340—172.5 7 Claims
Int. Cl. G11b *13/00, 31/00*

ABSTRACT OF THE DISCLOSURE

A display system automatically provides the correct deflection signals to draw predetermined lines or vectors on a display device when the beginning and end X and Y coordinates of the line are specified in binary number form. The number representing a beginning coordinate is effectively subtracted from the corresponding number representing the end coordinate for both the X and Y axes of a line to provide differential X and Y binary values (i.e., $\Delta X$ and $\Delta Y$). The differential binary values are simultaneously converted from binary number form into analog signal form and are applied to the display device to produce the correct deflection to draw the desired line thereon.

In display systems, it is frequently desirable to be able to display line traces on an imaging device such as a cathode ray tube. The line traces may, for example, represent vectors, the outline boundaries of a map, or the like. To provide such a display the scanning beam of the display tube is deflected from point-to-point along a predetermined path. To deflect the scanning beam along the predetermined path, it is necessary at each breakpoint in the path to apply the proper deflection signals to the horizontal and vertical deflection circuits of the display device to move the scanning beam to the next breakpoint. In computer operated display systems, the deflection signals are stored in the memory of the computer and applied to the deflection circuits at the proper times. Heretofore, a programmer had to calculate the values of each deflection signal between each break point in the predetermined path and program the computer to provide these values. Such a procedure requires the expenditure of a relatively large amount of time and effort on the part of the programmers to perform the calculations necessary to display even simple maps. For complicated maps, the procedure is undesirably cumbersome and costly.

Accordingly, it is an object of this invention to provide a new and improved vector display system.

It is another object of this invention to provide a vector display system that permits complex maps to be programmed quickly and simply.

It is a further object of this invention to provide a new and improved display system that automatically generates the correct deflection signals to deflect a scanning beam from point-to-point along a predetermined path when only the locations of the predetermined points are specified.

A display system embodying the invention automatically provides the correct deflection values to draw predetermined line vectors on an imaging device. To accomplish this, the face of the imaging device is effectively divided into a plurality of postions defined by X and Y coordinate axes. Each line vector to be drawn is specified only by its beginning and end X and Y coordinates and these coordinates are expressed in binary number form. Each beginning coordinate of a vector is effectively subtracted from each end coordinate in each axis to provide X and Y differential values that are simultaneously converted from binary signal form into analog signal form.

The X and Y analog signals are component vector signals that produce a resultant vector signal. The resultant vector signal produces the desired line vector when applied to the imaging device.

In one embodiment of the invention, the imaging device comprises a cathode ray tube having a face on which a scanning beam is made to impinge to draw line vectors thereon. The face of the cathode ray tube is divided into a plurality of coordinate positions along X and Y axes that intersect at an origin at the geometric center of the face of the tube. The positions along the positive X and Y axes are designated by binary numbers whereas the corresponding positions along the negative X and Y axes are designated by the 2's complement of these binary numbers. Line vectors are imaged on the cathode ray tube by storing the binary number representing the beginning and end X and Y coordinates of each line vector in a storage device and reading the numbers consecutively into X and Y beginning and end registers. The 1's complement of an X axis coordinate number is algebraically added to the 2's complement of the other X axis coordinate number for each line vector and a 1 bit correction factor is added to the result. A similar addition is done for the Y axis coordinates of each line vector. This algebraic addition effectively changes the sign and subtracts the beginning coordinates from the end coordinates of each line vector to provide the X and Y differentials needed to give the proper resultant vector line. During this algebraic addition, the binary differentials are simultaneously converted to analog signals. The analog signals are integrated to apply linearly changing deflection signals to the horizontal and vertical deflection circuits in the imaging tube to deflect the scanning beam to display linear vectors on the face of the tube.

Figure 1:
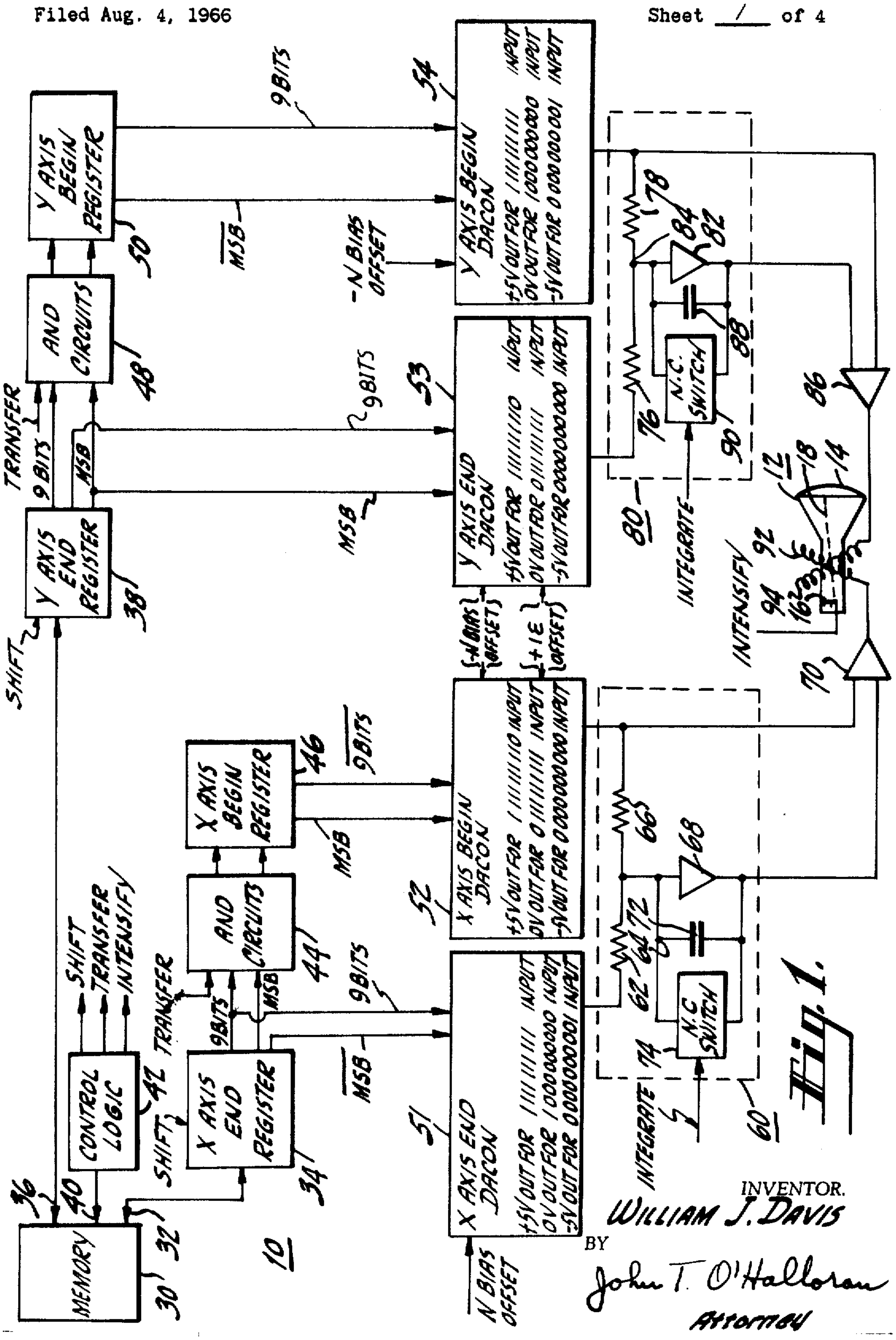
FIGURE 1 is a schematic block diagram of a vector display system embodying the invention.
Figure 2:
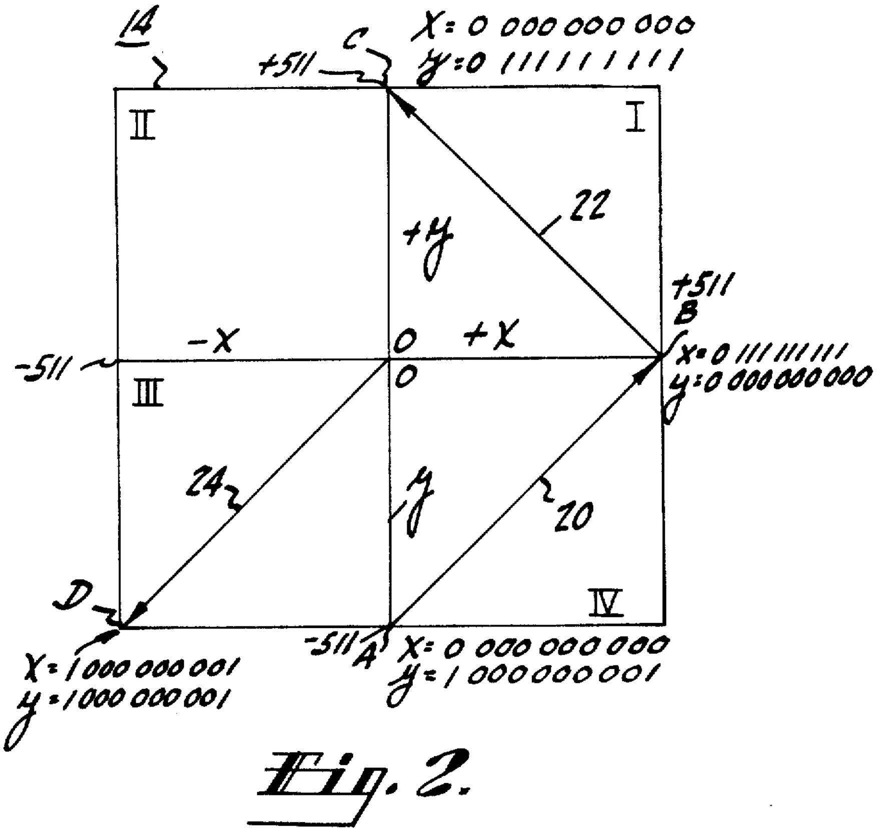
FIGURE 2 is a diagram of the face of the imaging device utilized in the system of FIGURE 1; and, FIGURES 3*a* and 3*b*, taken together, form a table helpful in understanding the operation of the system of FIGURE 1.

Referring to FIGURE 1, a vector display system 10 includes an imaging device 12 having a face 14 for displaying line traces or vectors thereon. The imaging device 12 may, for example, comprise a cathode ray tube having a cathode 16 that generates an electron scanning beam 18 that impinges on the phosphor face 14 of the imaging device 12 to draw vectors thereon. The face 14 of the device 12 is illustrated in FIGURE 2 and may, for example, comprise a square area. Any point in such a two-dimensional area is expressable in X and Y coordinates.

For convenience, the X and Y axes that define the coordinates are considered to originate at the geometric center of the face 14, because this is the rest position of the scanning beam 18 in the absence of deflection signals. The X and Y axes divide the face 14 into the four quadrants shown in roman numerals in FIGURE 2. Following the usual convention, the positive X axis is to the right of the origin whereas the negative X axis is to the left of this origin. Correspondingly, the positive Y axis is above the origin and negative Y axis is below the origin. Each point on the X and Y axes is designated by a binary number in the modulus N form providing N–1 positions in each positive and negative axis. For the face 14, the modulus N is selected to be 512 or, as expressed in binary form, 1 000 000 000. The origin is designated 0 000 000 000 and the highest position in each of the positive X and positive Y axes is 0 111 111 111, thereby providing 511 decimal positions in each of these axes. The corresponding (i.e., mirror image) positions in the negative X and negative Y axes are designated by the 2's complements of the positive numbers. Thus, the extreme negative position (i.e., —511) in each axis is the 2's complement of the binary number 0 111 111 111, which is 1 000 000 001. The 2's complement of each of the other positive binary numbers is found by subtracting the binary number from 10 000 000 000. By designating each point on the face 14 with X and Y coordinate numbers, each line vector to be imaged on the face 14 is located by specifying its beginning and the end X and Y coordinates. The display system 10 automatically draws any complex map on the face 14 when the beginning and end points of each boundary line of the map are specified. In the description to follow it is assumed for convenience that only the vectors 20, 22 and 24 are to be drawn on the face 14, as shown in FIGURE 2. The vectors 20 and 22 are to be drawn head-to-tail between the points A–B and B–C, respectively, whereas the vector 24 is to be drawn between the points O–D. Thus, the vector 24 is disconnected from either of the other two vectors. The X and Y coordinates of each of the points A through D are shown in FIGURE 2 for convenience. To draw the vectors 20, 22, and 24, a programmer need merely specify the beginning and end coordinates of each vector. Such a program may be written as shown in FIGURE 3. No calculations need to be made by the programmer to cause these vectors to be displayed on the imaging device 12.

The program shown in FIGURE 3 is written into a memory such as a magnetic drum 30 shown in FIGURE 1. The means for writing into the drum 30 and the means for rotating the drum are conventional and are not shown in FIGURE 1 for simplicity of drawing. Any other storage device may be utilized, of course, but a magnetic drum or disc is particularly appropriate in the display system 10 because the line vectors need to be periodically refreshed to keep them visible to a viewer. The rotation of the drum 30 is a convenient method of periodically refreshing this information. It is assumed in the system 10 that the X coordinates of all of the vectors are written onto one group of parallel tracks on the drum 30, whereas the Y coordinates of all the vectors, as well as the instruction commands to draw the vectors, are written on second and third parallel groups of tracks, respectively. The 10-bit numbers defining the X coordinates are read out of the drum 30 in parallel form by magnetic transducers 32 and shifted into a 10-stage register 34. The 10-stage register 34 functions as an X axis end coordinate vector register and may, for example, comprise 10 flip-flops for storing the 10 binary digits in each X coordinate position of the line vectors. The flip-flops are of the complementing type having "1" and "0" output terminals that provide signals that are the complement of each other. The Y coordinates of the vectors are read out of the drum 30 by magnetic transducers 36 and shifted into a Y axis end vector register 38. The register 38 may, for example, be identical to the register 34. The programmed instructions as well as timing signals are read from the drum 30 by the magnetic transducers 40 into a control logic circuit 42. The control logic circuit 42 provides the necessary signals to enter the information into the system 10 and transfer it from place-to-place therein at the correct times.

Each stage in the X axis end register 34 is coupled through AND circuits 44 to corresponding stages in an X axis begin vector register 46. The X axis begin register 46 is identical to the register 34. Similarly, each stage in the Y axis end register 38 is coupled through AND circuits 48 to corresponding stages in an identical Y axis begin vector register 50. The AND circuits 44 and 48 are activated to transfer the data into the registers 46 and 50, respectively, by transfer signals applied from the control logic circuit 42.

The beginning and end coordinates stored in the registers 34, 44, 38 and 50 are converted into analog signals in a plurality of digital-to-analog converters (DACONS) 51 through 54, respectively. The X axis begin vector DACON 51 is coupled to receive the inverse of the most significant bit ($\overline{\text{MSB}}$) of the binary coordinate number stored in the register 34 as well as the nine remaining bits in this coordinate number. The DACONS 51 through 54 may, for example, comprise switched resistor DACONS having 10 input terminals for receiving various combinations of 10-bit input signals. Switched resistor DACONS are essentially "single ended devices" that produce the highest analog signal output when a binary "1" signal is applied to each input terminal and the lowest analog signal output when a binary "0" signal is applied to each input terminal. However, the positional coordinate system on the face of the display device 12 is essentially "double ended" because of the positive and negative coordinate axes. Consequently, each binary input signal to the DACONS 51 through 54 has added to it the modulus N (i.e., 1 000 000 000) to effectively shift the origin and make the input signals "single ended." This addition of the modulus N and the dropping of any carry caused by such an addition is accomplished by inverting the most significant bit ($\overline{\text{MSB}}$) in the binary numerals applied to the DACONS 51 through 54. It is to be noted that a non-inverted most significant bit (MSB) is applied to each of the DACONS 52 and 53 because the binary numerals in the registers 38 and 46 are complemented. Such a complementation reinverts the most significant bit, as will be described in more detail subsequently.

Since each binary coordinate number as derived from the registers 34, 38, 46 and 50 has effectively added thereto a binary number equal to the modulus N, such a number also has to be subtracted from these coordinate numbers to maintain the correct values. This is accomplished by applying an N modulus negative bias offset to each of the DACONS 51 through 54. The N modulus negative bias offset tends to position the scanning beam 18 in the device 12 off the face 14 of the device 12. Thus, in the absence of an input signal, a —N bias does not produce a spot of light on the face 14. Such a —N bias offset effectively counteracts the N modulus addition but still permits the binary input signals to be "single ended" before application to the "single ended" DACONS 51 through 54. The remaining nine less significant binary bits (9 bits) in each of the registers 34 and 50 are applied to the DACONS 51 and 54 unaltered. All of the binary bits applied from the registers 38 and 46 to the DACONS 53 and 52, respectively, are inverted to apply the 1's complement of these coordinate numbers to the DACONS. This second inversion of the most significant bit (MSB) means that this bit is applied unaltered to the DACONS 52 and 53. The nine less significant bits are inverted ($\overline{\text{9 BITS}}$) for example by taking the output from the "0" output terminal of the complementing flip-flops in the registers 38 and 46. The output from the "1" output terminal of each of the flip-flops is the true or non-inverted form.

The 1's complement is derived so that the beginning and end coordinates in each of the X and Y directions may be subtracted from each other. When two numbers are expressed in the 2's complement notation, they are subtracted from each other by adding the 1's complement of one number to the 2's complement of the other number and then adding a binary 1 correction bit to the least significant bit in the sum of the two numbers. Consequently, a 1 epsilon or binary 1 is added to the DACONS 52 and 53 to provide this correction bit. This 1 epsilon bias offset produces the same deflection in the scanning beam 18 in the display tube 12 that a least significant binary 1 input bit does.

The analog outputs of the DACONS 51 and 52 are applied to an X axis summing and integrating amplifier network 60. The DACON 51 is coupled through a resistor 62 to an input junction point 64 whereas the DACON 52 is coupled through a matching resistor 66 to the same junction point. The junction point 64 comprises the input terminal of a high gain inverting amplifier 68 coupled between the junction point 64 and a summing amplifier 70. A feedback capacitor 72 is shunted across the inverting amplifier 68 to integrate the algebraic sum of the signals applied to the network 60. A normally closed switch 74 which may, for example comprise a transistor switch, is coupled across the capacitor 72 to short out this capacitor when the switch is closed. An integrate signal that is generated in the control logic circuit 42 opens this switch 74 periodically to cause the network 60 to integrate the input thereto. The output of the network 60 is applied to one input terminal of the driver amplifier 70 along with the output of the DACON 52.

The Y axis DACONS 53 and 54 are coupled to matched input resistors 76 and 78, respectively, of a Y axis integrating amplifier network 80. A high gain inverting amplifier 82 is coupled between the junction point 84 of the resistors 76 and 78 and one input terminal of a driver amplifier 86. An integrating capacitor 88 is shunted across the amplifier 82 and a normally closed switch 90 is shunted across the capacitor 88. An integrate signal from the control logic circuit 42 opens the switch 90 when applied thereto. The output of the DACON 54 is connected to the other input terminal of the summing amplifier 86. The X axis driver amplifier 70 is coupled to the X axis deflection coil 92 whereas the Y axis driver amplifier 86 is coupled to the Y axis deflectiion coil 94. The X and Y deflection coils 92 and 94 deflect the electron beam 18 in the imaging device 12. An intensify signal from the control logic network 42 is coupled to the cathode 16 of the device 12 to unblank this device when the integrating amplifier circuits 60 and 80 are to function.

In operation, it is assumed that the vectors 20, 22, and 24 are to be displayed on the face 14 of the imaging device 12 in accordance with the program tabulated in FIGURE 3. The operations of the system 10 resulting from this program are also tabulated in FIGURE 3. As the drum 30 is rotated, a timing pulse that is picked up by the transducer 40 causes the control logic circuit 42 to generate a shift pulse to shift the X and Y coordinates of the position A into the X and Y end registers 34 and 38, respectively. Immediately after the shift pulse is generated, the command "initiate vector" is read out of the memory 30 to cause the control logic circuit 42 to generate a transfer pulse which is applied to transfer the X and Y coordinates of the position A from the registers 34 and 38 through the AND gates 44 and 48 to the begin registers 46 and 50, respectively. This also places the X and Y coordinates of the beginning of the vector 20 in the begin DACONS and thus in the proper DACONS for initiating this vector on the face 14. The normally closed switches 74 and 90 remain normally closed and prevent the integrating networks 60 and 80 as well as the DACONS 51 and 53 from affecting the position of the scanning beam 18. Additionally, the display tube 12 is blanked due to the absence of an integrate signal applied from the control logic circuits 42. Therefore only the DACONS 52 and 54 in combination position the scanning beam 18.

For convenience in explaining the operation of the system 10 the binary inputs to the DACONS 51 through 54 are translated into their equivalent voltage outputs in FIGURE 1 and the resultant effect on the positioning of the scanning beam 18 along the ±511 positions in the X and Y axis is described. To position the scanning beam 18 at the decimal position ±511, it is assumed that the application of ±5 volts to the driver amplifiers 70 and 86 is required. The application of 0 volts to these amplifiers positions the beam 18 at the origin of the X and Y axis. To accomplish this positioning it is necessary that the DACONS 51 through 54 produce a maximum output of 10 volts in the absence of the —5 volt offset produced by the —N modulus bias. Thus the DACONS 51 and 54 normally produce a 10 volt output with a maximum binary input of 1 111 111 111 thereto. However, the —N modulus offset of —5 volts reduces the output to +5 volts. A minimum binary input of 0000000001 with the —5 volt bias offset produce an output of substantially —5 volts. In the absence of a bias offset, the DACONS 52 and 53 normally produce a 10 volt output with a binary input of 1 111 111 110 because a positive 1 bit offset is also added thereto. However, the —N modulus bias offset of —5 volts also reduces the output of these DACONS to +5 volts similar to the DACONS 51 and 52. A binary input of 0 000 000 000 to the DACONS 52 and 53 produces a —5 volt output. It is also assumed that a negative voltage going input to the driver amplifier 7 moves the scanning beam 18 to the right side of the face 14 whereas a negative going input to the driver amplifier 86 moves the scanning beam 18 down on face 14.

The input to the X axis begin vector DACON 52 for the beginning of the vector 20 is 0 111 111 111, which produces an output voltage of 0 volt. This is because a +1 bit offset when added to a —N offset of —1 000 000 000 produces a resultant —0 111 111 111, which effectively cancels the input to this DACON. The DACON 52 tends to position the scanning beam 18 at the origin since the driver 70, with no input thereto, produces no deflection signal for the X axis. The Y axis coordinate 1 000 000 001 in the begin register 50 is applied as 0 000 000 001 to the Y axis begin vector DACON 54. Such a number when combined with the —N modulus offset of —1 000 000 000 produces a resultant —0 111 111 111. This resultant indicates that a —5 volt output is produced by the DACON 54. The negative going input to the driver amplifier 86 moves the scanning beam 18 down on the face 14. The scanning beam 18 is therefore positioned to the point A in FIGURE 2 with the tube 12 being blanked during such positioning. The beam 18 is therefore at the beginning of the vector 20.

At the next shift pulse generated by the control logic 42, the X and Y cordinates of the point B are shifted into the X and Y end registers 34 and 36, respectively. The X and Y coordinates in the begin registers 46 and 50 are not affected by this shift. Consequently, the registers 34 and 38, and the registers 46 and 50 now store the beginning and end cordinates for the vector 20. A write vector command is then received by the control logic 42 which produces an integrate signal to unblank the display tube 12 and open the switches 74 and 90. With the opening of the switches 74 and 90, the integrating and summing networks 60 and 80 add the inputs thereto to produce an algebraic sum of these inputs. The algebraic sum is integrated to produce linearly changing deflection signal components. The input to the X axis end DACON is 1 111 111 111, which in conjunction with the —N offset of —1 000 000 000 results in an effective input thereto of 0 111 111 111. Such an effective input produces an output of +5 volts from the DACON 51. Since the input to the X axis begin DACON 52 remains the same, the output of the DACON 52 remains zero. The +5 volt output from the DACON 51 and the 0 volt output from the DACON 52 are algebraically added at the input resistive network of the integrating amplifier 60. The resultant +5 volt input to the amplifier is inverted and integrated in the integrating amplifier 60 to apply a negative going signal to the X axis deflection driver 70. The other input to the driver 70 is 0 volt. The driver 70 deflects the scanning beam 18 along the positive X axis toward the right of the face 14 of the display device 12. The input to the Y axis end DACON 53 is 0 111 111 111 which when combined with a —N modulus offset of —1 000 000 000 and a +1 epsilon offset produces an effective input of 0 and consequently an output of 0 volt. The input to the Y axis begin DACON 54 is 0 000 000 001, which produces an output of —5 volts. The 0 output volts from the DACON 53 and the —5 output volts from the DACON 54 are algebraically added in the input resistive network 76 and 78 of the integrating amplifier 80 to produce a resultant —5 volt input. The input is inverted and integrated to produce a positively increasing input to the Y axis driver amplifier 80. The other input to the amplifier 80 is the —5 volt output from the DACON 54. The positively increasing voltage is summed with the −5 volts in the driver amplifier 86 to provide a deflection drive that moves the scanning beam 18 up from the point A on the face 14 of the tube 12 as shown in FIGURE 2. Since the driver amplifiers 70 and 86 are driven by integrated signals of the same absolute magnitudes driving for the same time, the resultant vector trace of the scanning beam 18 on the face 14 is a 45° vector 20 from point A to B, as shown in FIGURE 2. The output of the amplifier 86 becomes zero when the integrated signal reaches +5 volts because the other input to the amplifier 86 from the DACON 54 remains at −5 volts. Since these voltages are summed in the amplifier 86 to produce a resultant 0 volt output, there is no Y axis deflection of the scanning beam 18 at the point B in FIGURE 2.

To write the vector 22, the X and Y coordinates (111 111 111 and 0 000 000 000) of the point B, which is beginning of this vector, are transferred from the end registers 34 and 38 into the begin registers 46 and 50 respectively. The X and Y coordinates (0 000 000 000 and 0 111 111 111) of the point C, which is the end of this vector are shifted into the end registers 34 and 38 respectively. A signal equal to −5 volts is applied to the amplifier 60 from the begin DACON 52 whereas a signal equal to 0 volt is applied to this amplifier from the end DACON 51. An integrate signal is applied to the switch 74, as well as to the switch 90, and the display tube 12 is unblanked. The integrating network 60 producse a positive going signal that is applied to the driver amplifier 70 along with the −5 volt signal from the DACON 52. The scanning beam 18 is therefore deflected to the left or in the −X direction in the tube 12. Simultaneously a signal equal to 0 volt is applied to the network 80 from the DACON 53 whereas a signal equal to −5 volts is applied to this network from the DACON 54. The network 80 produces a positive going signal that is applied to the driver amplifier 86 along with the −5 volt signal from the DACON 54. The scanning beam 18 is therefore deflected up in the tube 12. The X and Y deflection voltages cause the 45° vector 22 to be displayed on the face 14 of the tube 12.

To write the vector 24, the scanning beam 18 is jumped to the origin point while the tube 12 is blanked so that no vector is displayed between the points C and O. The vector 24 is then displaced on the face 14 of the tube 12. The details of the display of the vector 24 are shown in the lines 8 through 13 of FIGURE 3.

It is to be noted that the X and Y coordinate numbers may be subtracted while still in binary form by utilizing the 2's complement notation. In the absence of such a utilization, the X and Y coordinates would have to be converted into analog form. One of the numbers would then have to be inverted in an inverter and the inverted and non-inverted numbers applied to the integrating amplifiers to be algebraically added therein. Such a procedure tends to introduce errors because of drift problems in the analog circuitry, e.g., the inverter.

Thus, a vector display system is provided that permits a plurality of vectors to be displayed on a display device merely by programming the beginning and end coordinates of these vectors as well as the appropriate commands to unblank the display device.

What is claimed is:

1. In a display system for displaying lines on a display device divisible into X and Y coordinate axes, the combination comprising means for storing in binary number form X and Y coordinate points of the beginning and end of a line to be displayed on said display device, means for effectively subtracting said binary numbers representing X and Y beginning coordinate points from binary numbers representing corresponding X and Y end coordinate points to derive differential X and Y components of the length of said line, and means for utilizing said differential X and Y components to control said display device to form said line.

2. The combination in accordance with claim 1 wherein the consecutive positive X and Y coordinates are designated by consecutive binary numbers and the corresponding consecutive negative X and Y coordinates are designated by the 2's complement of said binary numbers, and wherein said means for subtracting includes means providing the 1's complement of the binary numbers corresponding to one of said beginning and end coordinate points, and means for adding said 1's complemented number to the number representing the other coordinate point.

3. A display system comprising in combination, an imaging device having a face divisible into a plurality of coordinate positions along positive and negative X and Y axes, the consecutive positive positions in each of said axes being designated by consecutive binary numbers with the corresponding consecutive negative positions being designated by the 2's complement of said binary numbers, storage means for storing the binary numbers representing the X and Y coordinates of the beginning and end positions of a vector, means coupled to said storage means for providing the 1's complement of the binary numbers representing one of said positions, and means for adding one binary bit to each sum of the binary numbers representing the beginning and end positions of said vector to provide differential numbers representing the length and direction of said vector.

4. A display system in accordance with claim 3 wherein said imaging device comprises a cathode ray tube having a scanning beam for displaying lines on said tube.

5. A display system in accordance with claim 3 wherein said storage means comprises, a plurality of shift registers for storing the binary numbers representing the beginning and end positions of said vector for both said X and Y coordinate axes.

6. A display system in accordance with claim 5 wherein said shift registers comprise, a plurality of flip-flops connetced to be shifted simultaneously with each flip-flop having a pair of output terminals for providing a binary number and its complement, and means coupled to the complement output terminals of said flip-flops wherein the 1's complement of a binary number stored in one of said shift registers is desired.

7. A display system in accordance with claim 4 that further comprises a plurality of digital-to-analog connectors for converting said differential numbers into analog signals, and means for applying said analog signals to said cathode ray tube to deflect said scanning beam to display said vector.

References Cited

UNITED STATES PATENTS

| | | | |
|---|---|---|---|
| 3,366,935 | 1/1968 | Anderson | 340—173 |
| 3,364,479 | 1/1968 | Henderson et al. | 340—324 |
| 3,333,147 | 7/1967 | Henderson | 315—22 |
| 3,325,802 | 6/1967 | Bacon | 340—324 |
| 3,335,415 | 8/1967 | Conway et al. | 340—324 |

GARETH D. SHAW, *Primary Examiner.*

U.S. Cl. X.R.

340—324.1